(12) United States Patent
Chapin

(10) Patent No.: US 7,338,178 B2
(45) Date of Patent: Mar. 4, 2008

(54) INTERSTELLAR LIGHT COLLECTOR

(76) Inventor: Richard Chapin, 2555 E. 1st St., Suite 110, Tucson, AZ (US) 85761

( * ) Notice: Subject to any disclaimer, the term of this patent is extended or adjusted under 35 U.S.C. 154(b) by 0 days.

(21) Appl. No.: 11/174,948

(22) Filed: Jul. 5, 2005

(65) Prior Publication Data

US 2007/0008616 A1   Jan. 11, 2007

(51) Int. Cl.
*G02B 5/10* (2006.01)
*G01J 3/00* (2006.01)

(52) U.S. Cl. ............................ 359/853; 356/300

(58) Field of Classification Search ............ 359/399, 359/853; 356/305, 317–319, 326, 328, 331, 356/334, 300
See application file for complete search history.

(56) References Cited

U.S. PATENT DOCUMENTS

| | | | | |
|---|---|---|---|---|
| 3,905,352 A | * | 9/1975 | Jahn | 126/578 |
| 4,021,267 A | * | 5/1977 | Dettling | 136/246 |
| 5,016,265 A | * | 5/1991 | Hoover | 378/43 |
| 5,973,839 A | * | 10/1999 | Dorsel | 359/599 |
| 6,541,694 B2 | * | 4/2003 | Winston et al. | 136/246 |
| 6,730,840 B2 | * | 5/2004 | Sasaoka et al. | 136/246 |
| 2003/0071216 A1 | * | 4/2003 | Rabolt et al. | 250/339.02 |

* cited by examiner

*Primary Examiner*—Alessandro Amari
(74) *Attorney, Agent, or Firm*—Gavin J. Milczarek-Desai; Quarles & Brady LLP

(57) ABSTRACT

Devices and methods that collect, concentrate, and disperse celestial light into spectra of different wavelengths by utilizing a large collection mirror and a means for dispersion located at a focal point.

20 Claims, 3 Drawing Sheets

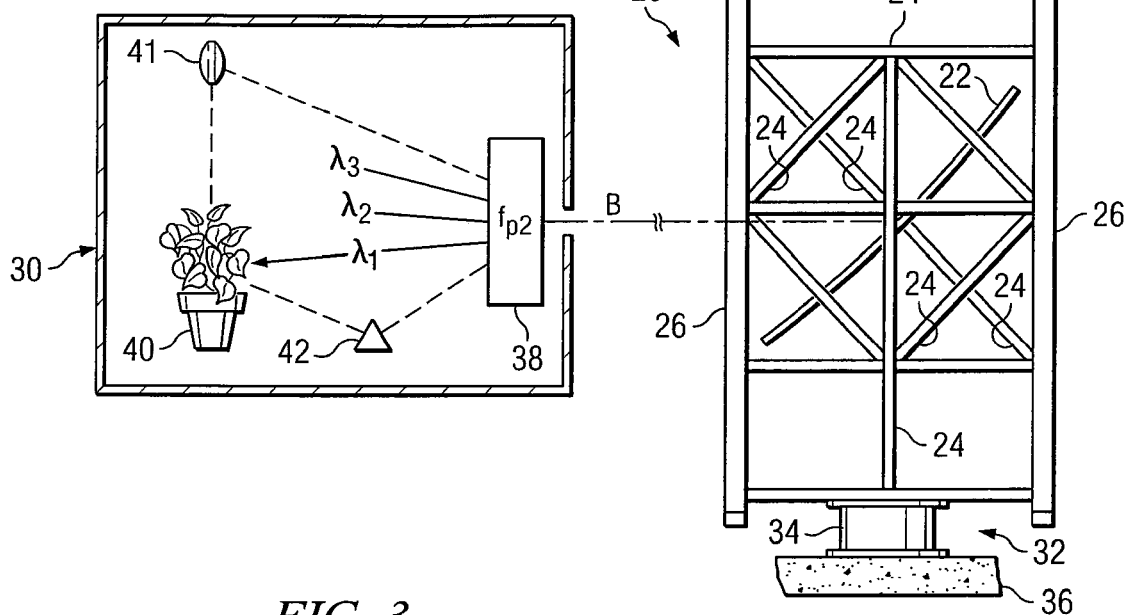
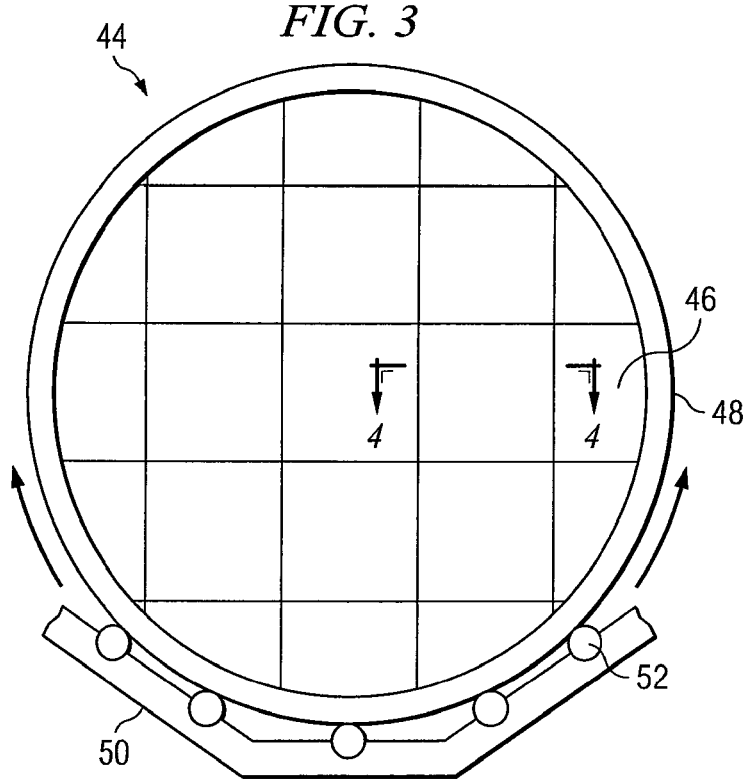
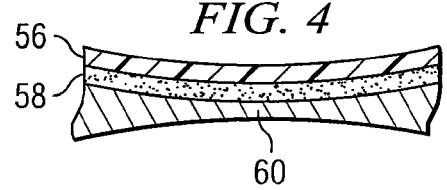

INTERSTELLAR LIGHT COLLECTOR

BACKGROUND OF THE INVENTION

1. Field of the Invention

The invention is directed generally to devices and methods for collecting and concentrating light emanating from outer space and celestial bodies, including, but not limited to, stars, planets, moons, and comets. More specifically, the invention involves interstellar light collection apparatus and methods for collection, selection of component wavelengths (e.g., through dispersion), and application of interstellar light to matter for investigative purposes.

2. Background of the Invention

Since the dawn of time, "light" (i.e., the electromagnetic spectrum) has been instrumental in everything from photosynthesis to modern photography. Solar light has been harnessed in photovoltaic cells to create electricity, light has been manufactured artificially to promote plant growth, and even non-visible light has been used in various medical applications such as X-rays and tumor detection devices.

Indeed, a large quantity of background reading is available on the subject of the industrial and medical application of light (see, for example, National Research Council, *Harnessing Light: Optical Science and Engineering for the 21$^{st}$ Century,* National Academy Press, 1998; Kaler, James B., *Stars and Their Spectra: An Introduction to the Spectral Sequence,* Cambridge University Press, 1989; Scranton, Bowman, & Peiffer, Editors, *Photopolymerization: Fundamentals and Applications,* American Chemical Society, 1996; and Kalyanasundaram & Gratzel, *Photosensitization and Photocatalysis Using Inorganic and Organometallic Compounds,* Kluwer Academic Publishers, 1993).

Current technologies for collecting celestial light involve the use of "light buckets," i.e., optical receiving telescopes that collect photons but are not diffraction limited. In other words, a light bucket cannot concentrate photons into a very small tightly focused spot.

Accordingly, light bucket technologies are hampered by the inability to concentrate light as would be useful in various methods of application, such as lasers. Moreover, traditional telescopes do not provide a means for dispersing focused light into component spectra for industrial or medical experimentation and application.

Thus, there exists a need for methods and devices for improved collecting, concentrating, and dispersing celestial light.

SUMMARY OF THE INVENTION

The invention relates in general to devices and methods for celestial light collection, concentration, and application. More specifically, the invention includes devices and methods for collecting, concentrating, and separating celestial light of different wavelengths and frequencies by utilizing a collection mirror and a means for dispersion located at a focal point.

It is the intended use of the inventive device to collect and harness interstellar light in order to utilize the uniqueness of its spectra for the benefit of humankind through various applications. Hence, the invention will collect, harness and apply the spectrums and intensities of the stars and other celestial bodies, which are notably different from the spectrum of the sun, and furthermore cannot be duplicated anywhere on earth.

This invention builds upon the principles and technology of basic telescopes. Instead of merely looking upon celestial bodies from earth, the present invention collects and concentrates light from celestial bodies down from the heavens and separates that light into various spectrums.

In one embodiment, the inventive method includes the steps of collecting light from a celestial source by utilizing a mirror, focusing the light collected by the mirror to a focal point, dispersing the focused light utilizing an aperture located at the focal point, and exposing terrestrial matter to at least a portion of the dispersed light.

Thus, it is a primary objective of the invention to provide a celestial light collector for concentrating and selecting light from celestial sources.

Another embodiment of the invention relates to a celestial light collector that includes a mirror, a focus cage disposed along a focal axis of the mirror, and a means for dispersing celestial light reflected by the mirror, wherein the means for dispersing is located along the focal axis and housed within the focus cage.

In another embodiment of the invention, a fresnel lens adapted to refract celestial light within a focus cage is utilized as, or in addition to, the means for dispersing. Alternatively, the means for dispersing light includes a lens between 0.5 and 8 millimeters in thickness or a prism.

Preferably, the mirror of the embodiments above is a polycarbonate parabolic mirror that is between 0.5 and 1.0 millimeters in thickness. Also preferably, the mirror is an altitude-azimuth off-axis segmented mirror that is between 2,000 and 4,000 square feet in size.

An aspect of the invention is that celestial light travels unobstructed into the focus cage, which may be disposed upon a rotating base member to better align with the mirror/collector. Moreover, the mirror itself in an embodiment of the invention is made rotatable by being disposed upon a rotating base member. Preferably, the rotating base member is a vertical axis azimuth stewing ring disposed atop a concrete pad.

Given the wind shear and other potential constraints on utilizing large exposed mirrors (i.e., mirrors not housed within a structure such as a building or silo), the mirror preferably is disposed within a topographic depression, the depth of which is equal to at least one-third of the height of the mirror.

Another embodiment of the invention features a celestial light collector that includes a parabolic mirror supported by a structure including struts and at least a pair of slewing rings such that the structure is rotatable in a horizontal plane, a focus cage disposed along a focal axis of the mirror, and a means for dispersing celestial light reflected by the parabolic mirror, with the means for dispersing located along the focal axis and housed within the focus cage.

In accordance with these and other objects there is provided new and improved devices and methods for collecting, concentrating, and selecting celestial light spanning light spectra of electromagnetic radiation (e.g., infrared, visible, and ultraviolet light).

Various other purposes and advantages of the invention will become clear from its description in the specification that follows. Therefore, to the accomplishment of the objectives described above, this invention includes the features hereinafter fully described in the detailed description of the preferred embodiments, and particularly pointed out in the claims. However, such description discloses only some of the various ways in which the invention may be practiced.

BRIEF DESCRIPTION OF THE DRAWINGS

FIG. 2 is a schematic side elevational view of a second embodiment of the invention.

FIG. 3 is a front elevational view of a third embodiment of the invention.

FIG. 4 is a cross-sectional detail view along line 4-4 from FIG. 3 showing the layer composition of a preferred mirror segment.

DESCRIPTION OF EXEMPLARY EMBODIMENTS

The invention relates in general to devices and methods for collecting, concentrating, and separating celestial light of different wavelengths and frequencies by utilizing a relatively large collection mirror and a means for dispersion located at a focal point. As such, the invention does not provide images of celestial objects.

The section headings used herein are for organizational purposes only and are not to be construed as limiting the subject matter described. All references cited in this application are expressly incorporated by reference for any purpose.

The term "celestial light" refers to light or electromagnetic spectra originating from somewhere other than the earth and covering the entire range from ultraviolet to infrared.

I. Celestial Light Collectors

Figure 1:
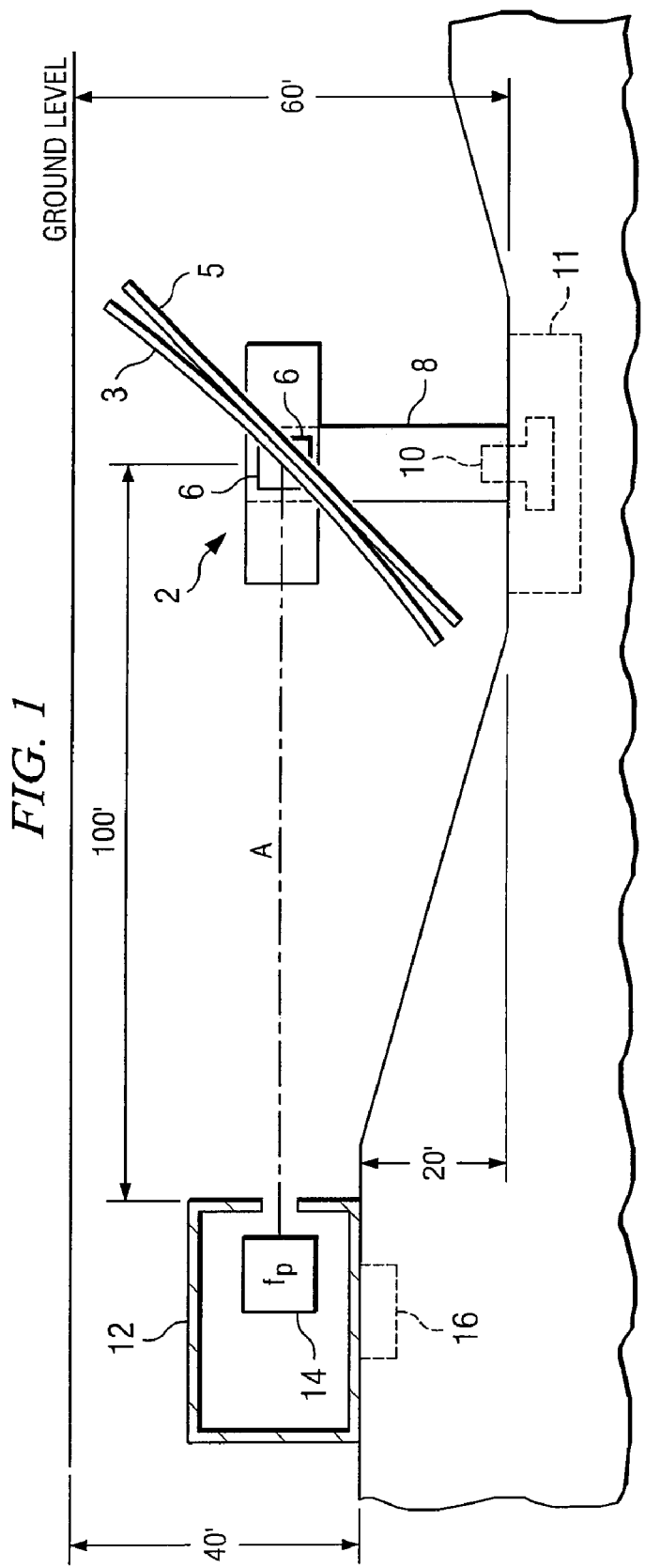
FIG. 1 is a schematic side elevational view of an apparatus of the invention.

FIG. 1 is a side elevational view of a first embodiment of the invention. Shown is a celestial light collector 2 that includes a mirror 3, preferably of parabolic configuration and manufactured of polycarbonate between 0.5 and 1.0 millimeter in thickness, supported by a substrate 5 and made rotatable by pivot 6. The pivot 6 is disposed horizontally on a stand 8, which is joined to a rotatable base 10 in a pad 11 of, preferably, cement. The pivot 6 and base 10 allow the mirror 3 to be adjusted in both the vertical and horizontal planes.

A focus cage 12 is disposed along a focal axis A of mirror 3 and positioned a distance from the mirror corresponding to a focal point $f_p$. Located along the focal axis A and housed within the focus cage 12 is a means 14 for dispersing celestial light reflected by the mirror 3. Preferably, the means 4 for dispersing light is located at the focal point $f_p$, thereby concentrating the spectrum before dispersion takes place. Exemplary means for dispersing light include, but are not limited to, apertures, such as filters, lenses, diffraction gratings, and prisms.

Although not shown in this figure, the collector 2 may further include a fresnel lens and/or a parabolic mirror adapted to refract celestial light within the focus cage.

In order to collect and concentrate a large amount of light, the collector 2 must be relatively large. Preferably, the mirror 3 is actually a segmented array made up of many smaller mirror areas that total between 2,000 and 4,000 square feet. Given this large size, the focus cage 12 and mirror 3 preferably are not co-located within a common building. Indeed, for the collector illustrated by FIG. 1, there is 100 feet of open distance between the mirror and the focus cage. Accordingly, the distance between the focus cage and mirror such that the cage can be located at a focal point will necessarily depend on the mirror size.

In this regard, the focus cage 12 preferably is mobile. Mobility may take the form of rotation, such as that achieved by having the focus cage 12 disposed upon rotating base member 16, or, for example, by attaching the cage to a track system (not illustrated) such that it may move toward or away from the mirror 3 or concentrically around the mirror as the mirror rotates.

Unlike spectroscopes, the collector of the invention does not rely on slits or diffraction gratings to separate light into component wavelengths, and the celestial light collected by the mirror does not pass through analytical instrumentation, such as a photomultiplier or photodetector. Moreover, in contrast to spectroscopes, the invention concentrates interstellar light before dispersion into component wavelengths takes place.

To reduce stress such as wind shear upon the invention, the collector 2 preferably is disposed within a topographic depression, the depth of which is equal to at least one-third of the height of said mirror. However, in the embodiment illustrated in FIG. 1, the collector 2 is disposed in a depression that is approximately sixty feet deep from ground level, which well exceeds one-third of the mirror height (also about sixty feet).

Turning to FIG. 2, a light collector array 20 of the invention is shown. The collector array 20 includes a parabolic mirror 22 housed within a structure of struts 24, with a pair of slewing rings 26 disposed at each end of the parabolic mirror 22. The slewing rings 26 provide for attitude control, and, moreover, allow light reflected from the mirror to travel unobstructed to the focus cage 30 along an optical axis B. The focus cage 30 is a building that will preferably contain research subjects, organic and inorganic matter, etc., onto which light may be applied.

Preferably, the structure of struts 24 is mounted upon a rotatable base 32, such as a vertical axis azimuth stewing ring 34 bolted atop a concrete pad 36. Also preferably, the focus cage 30 is disposed along focal axis B of the mirror 22 such that a means 38 for dispersing celestial light reflected by parabolic mirror 22 is located at a focal point ($f_{p2}$) that is housed within the focus cage.

As a result of locating the dispersion means 38 at focal point $f_{p2}$, concentrated light is separated into component wavelengths (e.g., $\lambda_1, \lambda_2, \lambda_3$). One or more of the component wavelengths are then used to expose matter (in this case biological matter 40), thereby ascertaining the effects of a spectrum of light not found on the earth. The concentrated light may further be manipulated by, for example, fresnel lens 41 or prism 42 before matter exposure.

Preferably, the collector 20 has only a single mirror to reflect light to the focus cage 30, allowing light to travel unobstructed thereto. Also preferably, the means for dispersing light includes a lens between 0.5 and 8 millimeters in thickness.

Turning to FIG. 3, a third embodiment of a mirror of the invention is shown.

Mirror 44 is composed of an array of segments 46 and is preferably parabolic in shape. The segments 46 are surrounded by a drive ring 48 that is in rotational contact with altitude yoke 50 via rollers 52. The altitude yoke 50 preferably surrounds the drive ring 48, although only a cut-away portion is shown in this particular illustration.

The segmented design allows the construction of relatively large mirrors, i.e., 20-80 feet in diameter. Given this relatively large mirror size, the concentration of interstellar light is believed to be well beyond known collectors, in that the concentrated light is at least five orders of magnitude brighter than a single object viewed.

FIG. 4 is a cross-sectional view of an individual mirror segment. A thin (e.g., 0.5 millimeter) plastic mirror 56 (e.g., polycarbonate) is laminated onto a foam substrate 58. The foam substrate may include, for example, a five centimeter slab of urethane. The foam substrate layer 58 is further laminated onto a rigid panel 60, such as aluminum sandwiched between fiberglass for good thermal conductivity.

Figure 5:
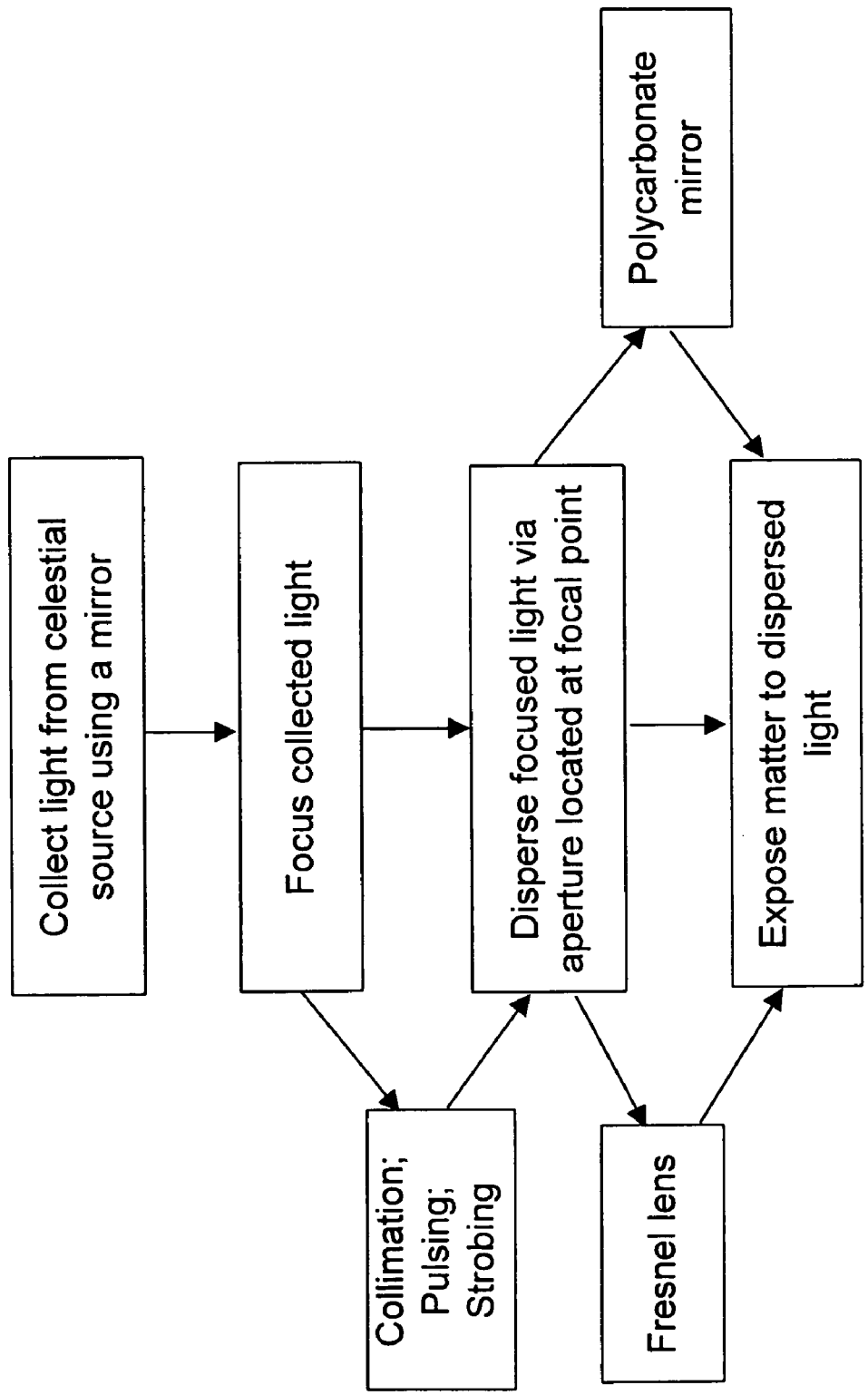
FIG. 5 is a block diagram illustrating method steps of the invention.

II. Methods for Concentrating and Selecting Celestial Light by Wavelength and/or Frequency As summarized in FIG. 5, the inventive method for collecting celestial light includes the steps of collecting light from a celestial source by utilizing a mirror, focusing the light collected by the mirror to a focal point, dispersing the focused light utilizing an aperture located at the focal point, and exposing terrestrial matter to at least a portion of the dispersed light.

In some applications, the method of the invention may further involve collimating the collected and/or dispersed light, utilizing a fresnel lens, or utilizing a polycarbonate parabolic mirror prior to dispersion. Preferably, the mirror comprises a polycarbonate mirror structure that is between 0.5 and 1.0 millimeters in thickness and is disposed upon a mobile supporting structure. Moreover, the focal point aperture preferably is a lens between 0.5 and 8.0 millimeters in thickness.

In other applications, the concentrated interstellar light is collimated and further pinpointed to less than a millimeter by using fresnel lenses or parabolic mirrors. In still other applications, the collimated light is pulsed or strobed. Due to the barriers, such as the atmosphere, and the relatively weak intensity of un-concentrated interstellar light, the method presents a unique opportunity to expose biological matter to previously unknown spectra.

III. Applications of Collected and Concentrated Celestial Light

In certain embodiments, methods for applying concentrated and selected celestial light are contemplated.

1) Medical:
A) Photo Dynamic Therapy—Using light to treat cancer, detect tumors, and to treat skin diseases such as psoriasis. Other uses would be to treat ailments such as Seasonal Affective Disorder or clinical depression.
B) Surgery—Using light to develop new technologies for minimally invasive therapies, methods that reduce trauma involved with traditional surgical techniques.
C) Optical Diagnostic Techniques—In this field, light has such applications as blood monitoring, retinal photography, and glucose monitoring in diabetes.

2) Entertainment:
A) LASER Light Shows—Entertaining light shows, often choreographed with music, such as those seen at hotels and casinos in Las Vegas, Nev., or at amusement parks.
B) Holograms—Including advancements in reversible holography and switched holographic gratings.

3) Agriculture:
A) Germination: Using light to stimulate or inhibit the growth processes, such as photoblastic stimulus of seeds. One potential use would be longer seed dormancy.
B) Phytochromatic Stimulus: Using light to control responses of the photoreceptor phytochrome in plants, in order to stimulate desired growth patterns.
C) Vegetative Stimulus: Using light to stimulate the major growth receptors in plants, such as cytokinine, in order to achieve desired effects.

4) Industry:
A) Photopolymerization: Currently, there are a myriad uses for photopolymerization. Four such applications would involve using light to create the following: plastics that are more durable, adhesives, sealants, and metal coatings.
B) Photolithography: Using light essentially as an enabler in integrated circuit processing.
C) Optical storage: Using light to enable existing technologies, such as compact disks, to store more information.
D) Printing Materials: Including pre-press proofing systems, printing inks, printing plates, and the production of Braille materials.

5) Scientific Research:
A) Photochemistry: Including experimentation through photosensitization and photocatalysis.
B) Photoelectric Effect The invention, having been described above, may be better understood by reference to examples. The following examples are intended for illustration purposes only, and should not be construed as limiting the scope of the invention in any way.

PROPHETIC EXAMPLES

Example 1

Celestial light is concentrated and selected for application to the skin of a test subject suffering from depression. This can be achieved with as little as 30 min. of very bright light near 10,000 lux or with a couple hours of light of about 2500 lux so as to simulate an average daily exposure for light, i.e., 250 or more lux for a sunny location.

Example 2

A theory has been developed that celestial pure light, being comprised of alpha particles, ions, protons and neutrons, is different than artificially produced light; and, that this light comes in various wavelengths and frequencies and therefore various colors. The invention could be used to test this theory by collecting, concentrating, and dispersing celestial light so that its color, wavelength, and frequency can be studied and compared with artificially produced light.

Example 3

A theory has been developed that the effects of the celestial pure light on the growth of various polymers and crystals will result in important shapes, sizes and structures in the industrial and scientific communities. This theory would be tested by exposing polymers and crystals to different wavelengths and intensities of celestial light collected, concentrated, and dispersed according to the method of the invention.

Example 4

A theory has been developed that celestial light will have profound effect on the chromophores in plants, and also the phytochromes, yielding various growth factors. To test this hypothesis, plant matter will be exposed to different wavelengths and intensities of celestial light collected, concentrated, and dispersed according to the method of the invention.

Example 5

A theory has been developed that utilizing the various wavelengths and frequencies of the celestial bodies will show results that are different than what is being researched in reference to porphyrins. In particular, we propose to expose porphyrins to different wavelengths and frequencies of celestial light collected, concentrated, and dispersed according to the method of the invention.

Various changes in the details and components that have been described may be made by those skilled in the art within the principles and scope of the invention herein described in the specification and defined in the appended claims. For example, the mirror of FIG. 3 may instead be trapezoidal in configuration. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A method for collecting celestial light, comprising the steps of:
   a) collecting light from a celestial source by utilizing a mirror;
   b) focusing said light collected by said mirror to a focal point;
   c) dispersing said focused light utilizing a means for optically dispersing light located at said focal point; and
   d) exposing terrestrial matter to at least a portion of said dispersed light.

2. The method of claim 1, wherein said optically dispersed light is further manipulated utilizing a fresnel lens prior to step (d).

3. The method of claim 1, wherein said mirror comprises a polycarbonate mirror that is between 0.5 and 1.0 millimeters in thickness.

4. The method of claim 1, wherein said means for optically dispersing light is a lens between 0.5 and 8.0 millimeters in thickness.

5. The method of claim 1, wherein said matter in step (d) is biological matter.

6. A celestial light collector, comprising:
a mirror;
a focus cage disposed along a focal axis of said mirror; and
a means for optically dispersing celestial light reflected by said mirror, wherein said means for optically dispersing is located along said focal axis and housed within said focus cage, wherein said mirror is disposed upon a rotating base member.

7. The collector of claim 6, further including a fresnel lens adapted to refract celestial light within said focus cage.

8. The collector of claim 6, wherein said mirror comprises a polycarbonate parabolic mirror.

9. The collector of claim 8, wherein said mirror polycarbonate mirror is between 0.5 and 1.0 millimeters in thickness.

10. The collector of claim 6, wherein said mirror comprises a altitude-azimuth off-axis segmented array.

11. The collector of claim 10, wherein said segmented array is between 2,000 and 4,000 square feet.

12. The collector of claim 6, wherein said focus cage and said mirror are not co-located within a common building.

13. The collector of claim 6, wherein said means for optically dispersing said light comprises a lens between 0.5 and 8 millimeters in thickness.

14. The collector of claim 6, wherein said celestial light collected by said mirror does not pass through analytical instrumentation.

15. The collector of claim 6, wherein the focus cage contains a prism through which said celestial light is optically dispersed.

16. The collector of claim 6, wherein said celestial light travels unobstructed into said focus cage.

17. The collector of claim 6, wherein said rotating base member is a vertical axis azimuth slewing ring disposed atop a concrete pad.

18. A celestial light collector, comprising:
a parabolic mirror supported by a structure including struts and at least a pair of slewing rings, wherein said structure is rotatable in a horizontal plane;
a focus cage disposed along a focal axis of said mirror; and
a means for optically dispersing celestial light reflected by said parabolic mirror, wherein said means for optically dispersing is located along said focal axis and housed within said focus cage.

19. The collector of claim 18, wherein said mirror is the only mirror used to reflect light to the focus cage.

20. The collector of claim 18, wherein the reflected light is at least five orders of magnitude brighter than a single viewed object.

* * * * *